United States Patent
Onde et al.

(10) Patent No.: US 7,359,640 B2
(45) Date of Patent: Apr. 15, 2008

(54) OPTICAL COUPLING DEVICE AND METHOD FOR BIDIRECTIONAL DATA COMMUNICATION OVER A COMMON SIGNAL LINE

(75) Inventors: Vincent Onde, Mimet (FR); Maxime Teissier, Belmont, MA (US)

(73) Assignee: STMicroelectronics SA, Montrouge (FR)

( * ) Notice: Subject to any disclaimer, the term of this patent is extended or adjusted under 35 U.S.C. 154(b) by 588 days.

(21) Appl. No.: 10/675,206

(22) Filed: Sep. 30, 2003

(65) Prior Publication Data
US 2005/0069326 A1 Mar. 31, 2005

(51) Int. Cl.
*H04B 10/00* (2006.01)

(52) U.S. Cl. .................. 398/135; 398/41; 398/42; 398/79; 398/82; 398/138; 398/139; 398/128; 398/130; 398/115; 398/141; 398/119; 398/136; 398/137; 250/551; 250/227.14; 250/221; 250/227.24; 385/24; 385/12; 385/13; 340/555; 340/556; 340/557; 327/514; 327/574; 379/399; 379/373

(58) Field of Classification Search ............ 398/41, 398/42, 79, 82, 135, 138, 139, 128, 130, 398/115, 141, 119, 136; 379/399, 329, 373; 250/551, 214 R, 227.14, 221, 227.24; 327/514, 327/574; 257/82, 83, 84; 385/24, 12, 13; 340/555, 556, 557
See application file for complete search history.

(56) References Cited

U.S. PATENT DOCUMENTS

| | | | | |
|---|---|---|---|---|
| 5,255,111 A | * | 10/1993 | Kwa | 398/138 |
| 5,909,294 A | * | 6/1999 | Doerr et al. | 398/138 |
| 6,750,463 B1 | * | 6/2004 | Riley | 250/551 |

* cited by examiner

*Primary Examiner*—Hanh Phan
(74) *Attorney, Agent, or Firm*—Lisa K. Jorgenson; Jose Gutman; Fleit Kain Gibbons Gutman Bongini & Bianco P.L.

(57) ABSTRACT

Optical coupling device operates over a bidirectional data link between at least first and second communicators, each communicating data along a common wire of the data link. The device includes at least first and second optical couplers, each including a photon flux source and a photon flux detector. The photon flux source of the first and second optical couplers, respectively, is commanded by the first and second communicator, respectively. The photon flux detector of the first and second optical coupler, respectively, produces a signal on the data link at the first and second communicator, respectively, in response to the photon flux source of the second and first optical coupler, respectively, from the second and first communicator, respectively. An inhibitor inhibits the photon flux source of the second and first optical coupler, respectively, in response to an activation of the photon flux source of the first and second optical coupler, respectively.

25 Claims, 8 Drawing Sheets

OPTICAL COUPLING DEVICE AND METHOD FOR BIDIRECTIONAL DATA COMMUNICATION OVER A COMMON SIGNAL LINE

BACKGROUND OF THE INVENTION

1. Field of the Invention

The present invention relates to an optical coupling device and method operative in a bidirectional data transmission link. An optical coupling serves to provide voltage isolation, also known as galvanic isolation, between communicating devices which are located at respective ends of a data transmission link. Generally, an optical data coupling is implemented with one or several opto-isolators, each comprising a light emitting diode (LED) and a phototransistor operating in tandem. The separation between the LED and phototransistor defines an electrically isolated optical path. The LED acts as a photon flux source and is activated by the sending device to produce a signal carrying modulation. This modulation by illumination is detected by the phototransistor, which acts as a photon flux detector, connected the receiving device. In this way, a suitable modulated signal applied to the LED by a sending device can be reproduced across the isolated separation by the phototransistor to which the receiving device is connected.

2. Prior Art

For the purpose of illustrating a possible data exchange application involving opto-isolators for voltage protection, FIG. 1 shows first and second communicating systems 2 and 4 exchanging data bidirectionally through an in IR data link 6. In the example, the first system is a microcontroller application board for a high-voltage application 8, e.g. a motor, lighting system, domestic appliance, etc. The function of the microcontroller application board is to reproduce different operating conditions in response to real time command signals from the second system 4, and to deliver to the latter feedback data on various parameters of the high-voltage application. The second system, designated main command system 4, is composed of a main command personal computer (PC) 12 programmed to enable users to enter real-time commands to the high-voltage application through a keyboard 14, e.g. for programming the high-voltage application board, and to view the resulting parameters fed back from the high-voltage application 8 on a monitor screen 16.

The high-voltage application 8 has a simple input/output interface 18 through which operating commands and feedback back data are exchanged locally with a microcontroller 20 on the high-voltage application board. The exchange of data between the interface 18 and microcontroller 20 is through an internal wire two-way wire link 22 in accordance with a chosen protocol.

The command data from the main command system 4 and the feedback data-from the high-voltage application 8 are relayed via the internal microcontroller 20, the latter serving to reformat the information according to the protocols used by the high-voltage application 8 and main command PC 12.

The elements forming the high-voltage application board 2 are all powered from an AC line (mains) source e.g. at 110V ac. The line input is fed directly—without using a transformer—to the input of a full-wave rectifier bridge 26 composed of four rectifier diodes RD1-RD4. The rectified output of the bridge 26 is smoothed by a capacitor C and taken to the input of a self-powered DC-DC converter 28.

The DC-DC converter 28 chops and mixes the rectified output to produce a low voltage Vdd to power the microcontroller 20, the interface 18 of the high-voltage application 8, and possibly other components of the board 2, such as signalling diodes, etc. The high voltage for powering the high-voltage application is taken directly from the charged plate of the capacitor C.

As is typical with most low-cost transformerless implementations, the power supply for the microcontroller 20, in this case the DC-DC converter 28, is not fully isolated from the AC line source 24. Specifically, the ground reference line 30 for the microcontroller is wire connected to the ground or neutral of the AC line source via the rectifier bridge 26. This type of ground connection would raise a problem if it were attempted to connect the ground of the microcontroller 20 directly to the ground of the main command PC 12 or other part of the main command system 4, since the chassis of the latter could then be at a potential which is dangerous either for a user or for the circuitry.

Accordingly, the command system 4 is electrically insulated from high-voltage application board 2 by a system of opto-isolators in the signal link for the commands and feedback information. Typically, the opto-isolator is of the logic type, i.e. it operates on two logic states corresponding to an on and off states (i.e. conducting and non conducting states) for the transmission of digital data.

If the protocol for the signal link uses two separate paths respectively for sending and receiving, e.g. as in the RS232 serial transmission protocol, then the isolation can be achieved relatively simply by two opto-isolators to form the IR communications link 6, as illustrated in FIG. 1. The first opto-isolator is composed of a command-sending light emitting diode 34, on the main command system 4 and a command receiving phototransistor 38, on the high-voltage application board 2. Likewise, the second opto-isolator is composed of a feedback-receiving phototransistor 42, on the main command system 4 and a feedback-sending light detecting diode 46, on the high-voltage application board 2.

In this way, the optical paths for each direction are kept separate and can operate independently of each other.

However, with some protocols, an individual signal needs to be bidirectional over a common wire. This case is illustrated by FIG. 2, which represents the same application as for FIG. 1, but with a bidirectional bus system 48 for conveying the commands and feedback information, of the type in which data can flow along both directions along a single common wire path between the microcontroller 20 and main command PC 12. An example of such a bus system is a serial bus working under a protocol referred to as the In-Circuit Communication (acronym ICC) protocol, proprietary to STMicroelectronics.

Under these circumstances, opto-isolators cannot be interposed in the data wire path to obtain the isolation, since they are designed to pass information along one direction only.

Likewise, opto-isolators cannot be used either in applications where a command link may be connected by a single wire or a common group of wires to several addressable sending or receiving units, where each link is joined to an arbitrary number n of open-collector outputs of n respective sending and receiving units via pull-up or pull-down resistors and the signal can be imposed from either end of the link.

The problem that arises in attempting to use opto-isolators to exchange data bidirectionally along a single path is illustrated by FIG. 3, which shows a hypothetical circuit produced for the purpose of explaining the problem. In the Fig., two communicating units A and B are arranged each to send and receive data through a common bidirectional serial data wire $D_{CL}$ of a common serial data link. The latter can be the bidirectional bus of FIG. 2, units A and B being e.g. respectively the high-voltage application board 2 and the main command system 4.

In the illustrated example, a unit sends information by pulling the common data link $D_{CL}$ to a predetermined logic level, the latter being detected as a data bit by the other unit at the receiving end.

To this end, each unit has a transmission terminal (TxA for unit A and TxB for unit B) and a receiving terminal (RxA for unit A and RxB for unit B), both depending from the common data link $D_{CL}$. Specifically, the receiving terminal is taken from the common data link $D_{CL}$ via a buffer amplifier (50A for unit A, 50B for unit B), and the transmission terminal Tx is connected to the common data link via a transmission FET transistor switch (52A for unit A, 52B for unit B). The latter has its gate connected to its respective transmission terminal, its source connected to ground and its drain connected to the common data link $D_{CL}$.

The two units A and B are mutually electrically isolated by two identical opto-isolators 54 and 56. As shown in FIG. 4, each opto-isolator 54 or 56 is in the form of a package comprising a light emitting diode (LED) 58 and a phototransistor 60, mutually positioned so that IR light from the LED can illuminate the phototransistor. The phototransistor 60 is non conducting between its collector and emitter when not illuminated by the LED 58, and conducting between its collector and emitter when illuminated by the LED. The opto-isolator thus operates according to two states, i.e. as a logic type opto-isolator. For an opto-isolator, the terminals of the package for connection are thus the anode and cathode of the LED 58 for sending data and the collector and emitter of the phototransistor 60 for receiving data. The base of the phototransistor is activated by the light from its associated LED.

In FIG. 3, each unit A and B is cabled to a LED of one opto-isolator and to a phototransistor of the other. A LED or phototransistor cabled to a particular unit is identified by its Fig. reference followed by a suffix A or B depending on whether it is cabled to unit A or B respectively.

For unit A, LED 58A has its anode connected to the unit's positive power supply voltage Vdd via a pull-up resistor 62A, and its cathode connected both to the input of buffer 50A and to the collector of phototransistor 60A. The latter has its emitter connected both to ground and to the source of FET transistor 52A.

Correspondingly, for unit B, LED 58B has its anode connected to the unit's positive power supply voltage Vdd via a pull-up resistor 60B and its cathode connected both to the input of buffer 50B and to the collector of phototransistor 60B. The latter has its emitter connected both to ground and to the source of FET transistor 52B.

The pull-up resistors 62A and 62B serve to bias the common data link $D_{CL}$ to a voltage of Vdd minus the photodiode threshold voltage, i.e. the voltage drop across diode 62A or 62B when forward biased. This voltage is made to correspond to a logic 1 state on the common data link $D_{CL}$.

If unit A, say, needs to send one bit of data to unit B, then input TxA of unit A is set momentarily for the duration of a clock cycle from a normally 0 logic state to logic 1 (for an NMOS type of FET). The corresponding high voltage on the gate of FET 52 makes the latter conducting, producing two effects:

i) it forces the common data link $D_{CL}$ of unit B to substantially ground potential, and thus to logic 0 (the resistance of the phototransistor 60A or 60B is much less than that of pull-up resistor 62A or 62B). This transition to logic 0 is detected at terminal RxB of unit B as a data bit;

ii) it creates a current flow path from Vdd to ground via pull-up resistor 62A, LED 58A and the FET 52A itself. LED 58A thus becomes suitably biased to illuminate phototransistor 60B of unit B, making that phototransistor conductive. The selective switching on and off of transistor 52A can be expected in this way communicate data bits to common data link $D_{CL}$ at the level of unit B.

By symmetry, unit B can send data bits to unit A by selectively switching on and off of transistor 52B to force to logic 0 the common data link $D_{CL}$ at the level of unit A correspondingly at each switching of its FET 52B.

Note that when one unit is sending data, its own receiving terminal Rx at the common link $D_{CL}$ is also pulled to ground by the conducting state of the FET of that unit.

However, the circuit of FIG. 3 will fail since whenever one of the units A or B attempts to send data, there is created a lock up situation in which each of the two LEDs 58A and 58B switch on and remain on.

For instance, assume that unit A attempts to send data by making its FET 52A conducting (applying a logic 1 on the gate). Diode 58A of unit A shall then illuminate and make phototransistor 60B of unit B conducting, so bringing the potential at the cathode of LED 58B substantially to ground potential (more precisely, to ground potential plus the collector-emitter voltage drop across phototransistor 60B at saturation). LED 62B of unit B is thereby also biased to illuminate, and thereby causes phototransistor 60A of unit A conducting. The current flow path to ground provided by that phototransistor 60A creates a current path through LED 58A of the first unit separate from that of the FET 52, and therefore irrespective of whether the FET 52A of the latter is conducting or non conducting. Thus, each LED mutually causes the other to remain locked on.

By symmetry, the situation is identical, in reverse, if the transmission terminal TxB of unit B is activated. In this case the illuminated state of LED 58B causes the illuminated state LED 58A, the latter forcing LED 58B to remain illuminated.

SUMMARY OF THE INVENTION WITH OBJECTS

In view of the foregoing, an object of the invention is to provide an optical isolation along a wire path connecting two or more communicating units which allows a bidirectional exchange of data, whilst overcoming the aforementioned problem of locking.

According to a first aspect, the invention relates to an optical coupling device operative over a bidirectional data link between at least first and second communicating units, each operative to send and receive data along a common wire of the data transmission link, the device comprising:

at least first and second optical coupling means, each comprising a photon flux source and a photon flux detector, wherein:

the photon flux source of the first optical coupling means is commanded in response to a data transmission by the first communicating unit, the photon flux source of the second optical coupling means is commanded in response to a data transmission by the second communicating unit, the photon flux detector of the first optical coupling means is operative to produce a signal on the data transmission link at the first communicating unit in response to a command of the photon flux source of the second optical coupling means from the second communicating unit, the photon flux detector of the second optical coupling means is operative to produce a signal on the data link at the second communicating unit in response to a command of the photon flux source of the first optical coupling means from the first communicating unit, first inhibiting means for inhibiting the photon flux source of the second optical coupling means in response to an activation of the photon flux source of the first optical coupling means, and second inhibiting means for inhibiting the photon flux source of the first optical coupling means in response to an activation of the photon flux source of the second optical coupling means.

According to a second aspect, the invention relates to an optical coupling device operative over a bidirectional data link between at least first and second communicating units, each operative to send and receive data along a common wire of the data link, the device comprising:

at least first and second optical coupling means each comprising a photon flux source and a photon flux detector, wherein:

the photon flux source of the first optical coupling means is commanded in response to a data transmission by the first communicating unit, the photon flux source of the second optical coupling means is commanded in response to a data transmission by the second communicating unit, the photon flux detector of the first optical coupling means is operative to produce a signal on the data link at the first communicating unit in response to a command of the photon flux source of the second optical coupling means from the second communicating unit, the photon flux detector of the second optical coupling means is operative to produce a signal on the data link at the second communicating unit in response to a command of the photon flux source of the first optical coupling means from the first communicating unit, first inhibiting means for inhibiting the photon flux source of the second optical coupling means in response to an activation of the photon flux source of the first optical coupling means, and second inhibiting means for inhibiting the photon flux source of the first optical coupling means in response to an activation of the photon flux source of the second optical coupling means, wherein the bidirectional data link is normally biased to a first state when no data is present, data on the link being expressed by a forcing of the link to a second state, wherein at least one the communicating unit comprises:

a first connection path for connecting the data link to a source at the second state, the first path having interposed therealong a switch controlled by a data signal to be sent by the unit, whereby the data link can be forced to the second state in response to the data signal to be sent, a second connection path for connecting the data link to a source at the second state, the second path having interposed therealong the photon flux detector responsive to a photon flux from another communicating unit sending data to the communicating unit, the photon flux detector blocking the second path in the absence of a photon flux and making the second path connect the transmission link to the source at the second state in the presence of a photon flux, a photon flux source operative in response to the data signal to be sent by the communicating unit, the photon flux source being active when biased at a level above a threshold value and being connected between a driving power source and the source at the second state via the switch of the first conduction path, the photon flux source thereby being biased above the threshold value when the switch is conducting, and wherein the inhibiting means comprises means for forcing the biasing level of the photon flux source to be below the threshold value when the second connection path is made to connect the data link to the source at the second state, in the presence of the photon flux on the photon flux detector.

The data link can be a bidirectional serial type link.

According to a third aspect, the invention relates to a method of providing an optical coupling over a bidirectional data link between at least first and second communicating units, each operative to send and receive data along a common wire of the data transmission link, comprising the steps of:

providing at least first and second optical coupling means each comprising a photon flux source and a photon flux detector, wherein:

commanding the photon flux source of the first optical coupling means in response to a data transmission by the first communicating unit, commanding the photon flux source of the second optical coupling means in response to a data transmission by the second communicating unit, causing the photon flux detector of the first optical coupling means to produce a signal on the data transmission link at the first communicating unit in response to a command of the photon flux source of the second optical coupling means from the second communicating unit, causing the photon flux detector of the second optical coupling means to produce a signal on the data link at the second communicating unit in response to a command of the photon flux source of the first optical coupling means from the first communicating unit, inhibiting the photon flux source of the second optical coupling means in response to an activation of the photon flux source of the first optical coupling means, and inhibiting the photon flux source of the first optical coupling means in response to an activation of the photon flux source of the second optical coupling means.

According to a fourth aspect, the invention provides an optical coupling over a bidirectional data link between at least first and second communicating units, each operative to send and receive data along a common wire of the data link, comprising the steps of:

providing at least first and second optical coupling means each comprising a photon flux source and a photon flux detector, wherein:

commanding the photon flux source of the first optical coupling means in response to a data transmission by the first communicating unit, commanding the photon flux source of the second optical coupling means in response to a data transmission by the second communicating unit, causing the photon flux detector of the first optical coupling means to produce a signal on the data link at the first communicating unit in response to a command of the photon flux source of the second optical coupling means from the second communicating unit, causing the photon flux detector of the second optical coupling means to produce a signal on the data link at the second communicating unit in response to a command of the photon flux source of the first optical coupling means from the first communicating unit, inhibiting the photon flux source of the second optical coupling means in response to an activation of the photon flux source of the first optical coupling means, and inhibiting the photon flux source of the first optical coupling means in response to an activation of the photon flux source of the second optical coupling means, normally biasing the bidirectional data transmission link to a first state when no data is present, data on the link being expressed by a forcing of the link to a second state, for at least one the communicating unit:

creating a first connection path for connecting the data link to a source at the second state, the first path having interposed therealong a switch controlled by a data signal to be sent by the unit, whereby the data link is forced to the second state in response to the data signal to be sent, creating a second connection path for connecting the data link to a source at the second state, the second path having interposed therealong comprising the photon flux detector responsive to a photon flux from another communicating unit sending data to the communicating unit, the photon flux detector blocking the second path in the absence of a photon flux and making the second path connect the data link to the source at the second state in the presence of a photon flux, operating the photon flux source in response to the data signal to be sent by the communicating unit, the photon flux source being active when biased at a level above a threshold value and being connected between a driving power source and the source at the second state via the switch of the first conduction path, the photon flux source thereby being biased above the threshold value when the switch is conducting, and the inhibiting step comprising forcing the biasing level of the photon flux source to be below the threshold value when the second connection path is connecting the link to the source at the second state, in the presence of the photon flux on the photon flux detector.

BRIEF DESCRIPTION OF THE FIGURES

The invention and its advantages shall be more clearly understood, and its advantages more apparent from reading the following detailed description of the preferred embodiments, given purely as non-limiting examples, with reference to the appended drawings in which.

DETAILED DESCRIPTION OF THE PREFERRED EMBODIMENTS

Figure 5:
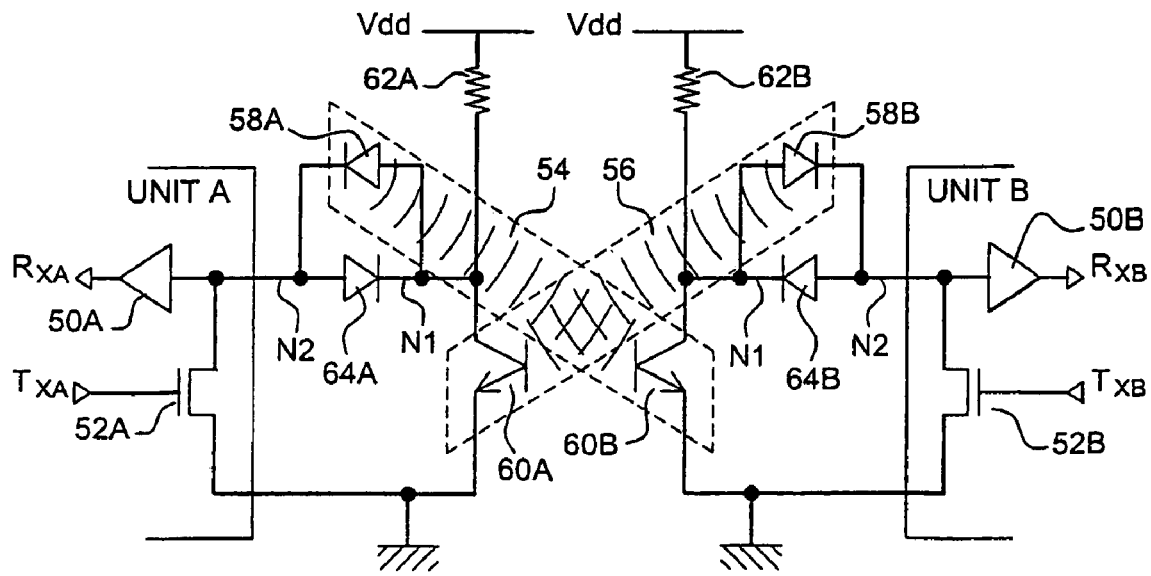
FIG. 5 is a circuit diagram of an opto-isolator circuit allowing bidirectional data communication over a common signal line in accordance with a first embodiment of the invention.

The circuit diagram of a first embodiment of the invention is shown in FIG. 5. The embodiment is based on the same two units A and B as in FIG. 3 communicating by the same protocol and the same internal circuitry as already described in connection with that Fig., notably as regards the buffer 50A/50B and transmission FET switch 52A/52B. Accordingly, the two units A and B exchange data using the common bidirectional serial data link $D_{CL}$ as described. Also, a system of two logic type opto-isolators 54 and 56 is present in that common data link $D_{CL}$ to isolate the units A and B.

Figure 1:
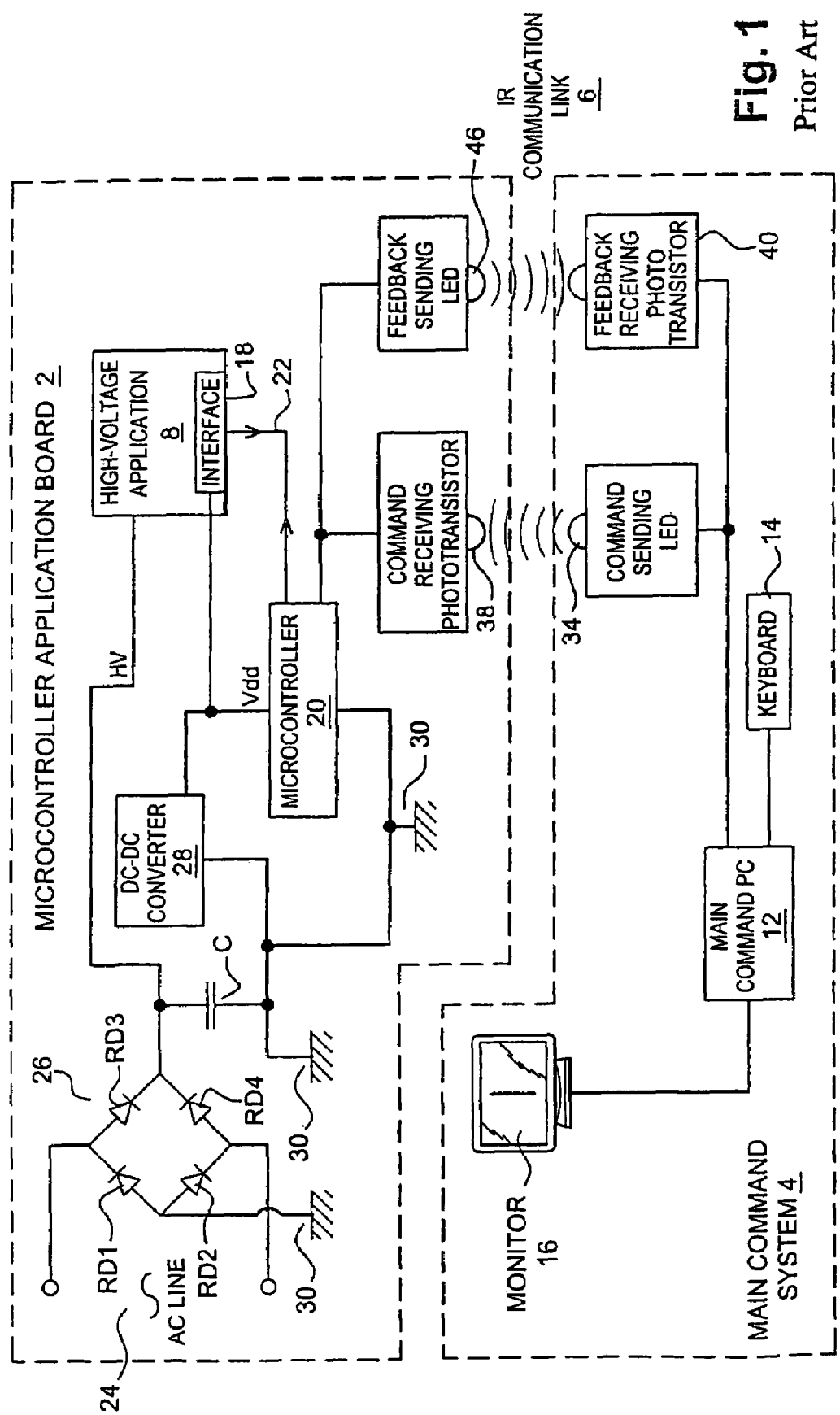
FIG. 1, already described, is a block diagram illustrating a possible application involving bidirectional data exchange between two units, in which opto-isolators provide voltage protection against voltage levels present in one of the units, where the bidirectional transfer uses separate channels for respective directions of data flow, FIG. 2, already described, is a block diagram showing the same application as in FIG. 1, but with a single data wire type of bidirectional communications link, where data can flow in both directions between the units along a common data wire, FIG. 3, already described, is a circuit diagram showing a hypothetical case of using two opto-isolators for exchanging data bidirectionally between units that communicate over a common, single-wire, bidirectional data line, to illustrate the problem of locking, FIG. 4, already described, is a diagram showing the components in an opto-isolator package.
Figure 2:
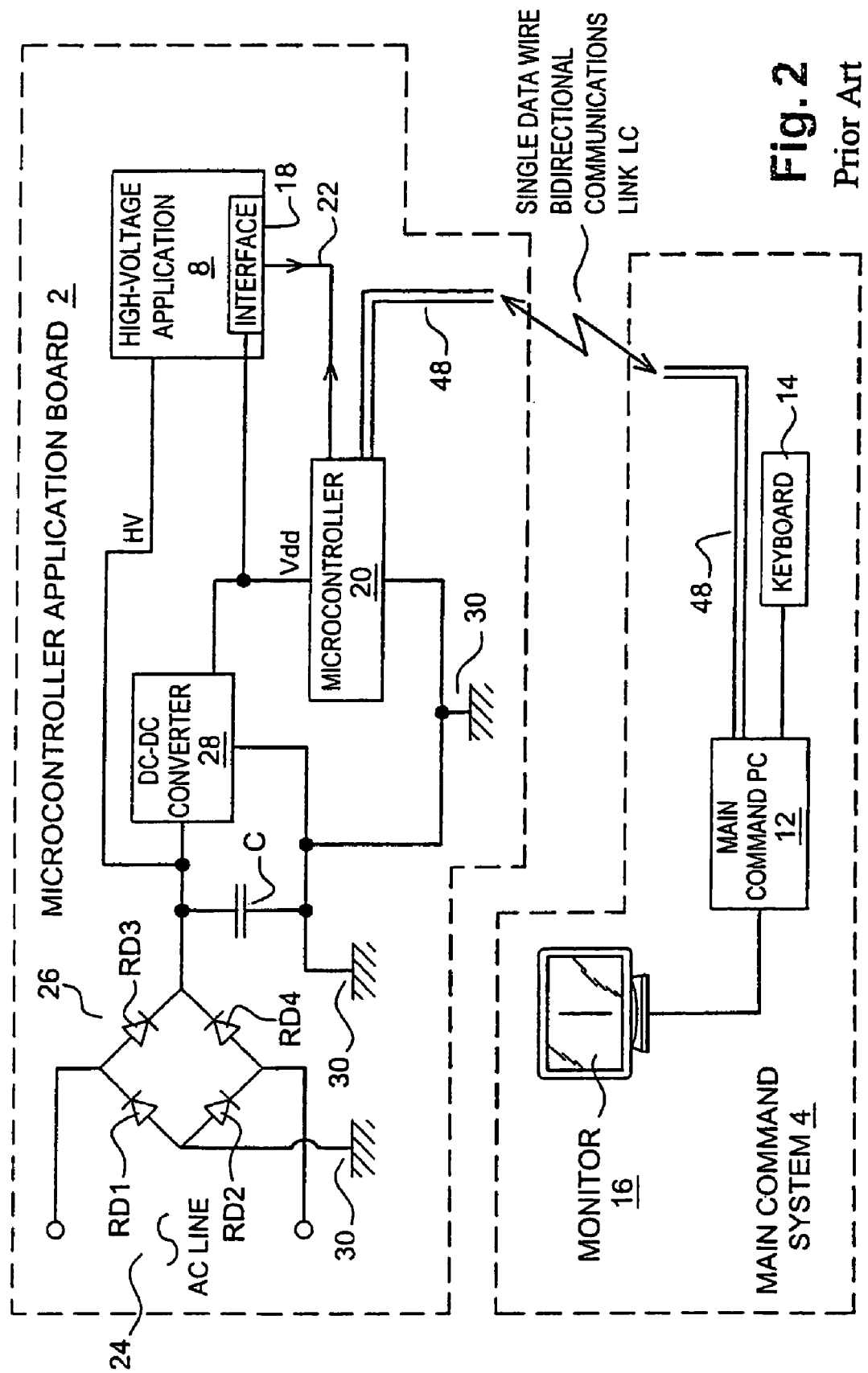
Figure 3:
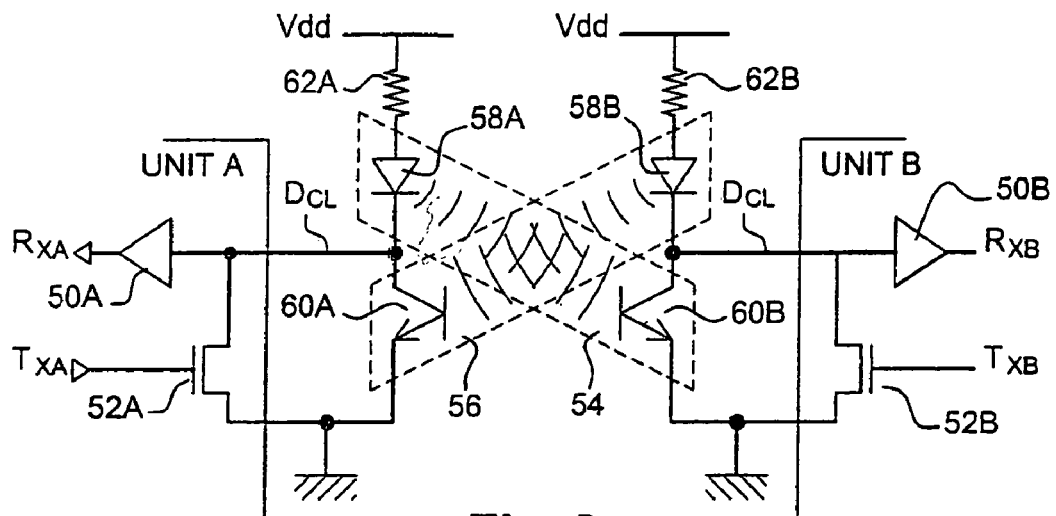

In FIG. 5, elements having already been described in the context of FIG. 3 have the same reference numerals as in FIG. 3 and, for the sake of conciseness, shall not be described again insofar as they have the same form or function, it being understood that the above description of features of FIG. 3 common to FIG. 5 are hereby incorporated by reference.

The circuit of FIG. 5 differs from that of FIG. 3 notably in that:

each LED 58A and 58B is connected in parallel to a Schottky diode, respectively designated 64A and 64B. The parallel connection is made with the LED and Schottky diode connected "head-to-foot", i.e. with the cathode of LED 58A/58B connected to the anode of Schottky diode 64A/6B and the anode of LED 58A/58B connected to the cathode of Schottky diode 64A/64B, and for each LED 58A and 58B of a given opto-isolator 54 or 56, the cathode is no longer connected directly to the collector of the phototransistor of the other opto-isolator 56 or 54, but rather to the input of the buffer 50A/50B of its communicating unit 50A/50B.

For each communicating unit 50A/50B there are thus defined two nodes:

a first node N1 which is common to:
i) the terminal of the pull-up resistor 62A/62B that is opposite the terminal connected to the positive power supply voltage Vdd,
ii) the anode of the LED 58A/58B driven by that unit,
iii) the cathode of the Schottky diode 64A/64B parallel connected to the above LED, and
vi) the collector of the phototransistor 60A/60B at the receiving end of that unit; and a second node N2 which is common to:
i) the input to the buffer 50A/50B of that unit,
ii) the cathode of the LED 58A/58B driven by that unit, and
iii) the anode of the Schottky diode 64A/64B parallel connected to the above LED.

In other respects, the circuit layout of the first embodiment is substantially as for FIG. 3.

The above configuration effectively prevents the conducting state of a phototransistor from creating a current flow path for the LED to which it is connected, while maintaining as before a current flow for that LED via the conducting state of the data transmission FET switch 52A/52B of the unit that drives its LED. This ensures that any of the two units can receive data in the normal manner by having its common transmission line forced to O logic voltage by a connection to ground through the collector-emitter channel of its receiving phototransistor 60A/60B, without causing its own LED to illuminate as a consequence, contrary to the problematic situation that arises with the configuration of FIG. 3.

In operation, each phototransistor 60A/60B exhibits a voltage drop in the on (conducting) state designated $V_{CEsat}$, which is close to 0V.

The two Schottky diodes 64A/64B are selected to have a low threshold voltage $V_{FD}$, preferably on the order of 0.2 to 0.3V, and less than the value of the forward bias voltage required to switch on the LEDs 58A/58B.

The two LEDs 58A/58B have a threshold voltage $V_{LED}$, typically of about 1.5 to 2.0 volts, which is higher than the value $V_{FD}$ of the Schottky diodes.

The voltage level of Vdd in the example is of around 5V. However, this voltage varies according to applications. For instance, it can be +12V for a link according to the I2C protocol, and can attain +24/48V in some industrial environments.

The Schottky diodes and the adapted circuit configuration effectively overcome the locking problem of the FIG. 3 configuration by ensuring that when the phototransistor of a receiving unit is conducting, the voltage across the LED of that unit cannot exceed $V_{CEsat}$, and therefore cannot cause the LED of that receiving unit to switch on. On the other hand, the Schottky diode of a sending unit shall become reverse biased when the FET switch 52A/52B of that unit creates a conductive path to ground for its LED, and shall therefore not interfere with the normal operation of that LED. (It is assumed here that the reverse bias breakdown voltage of the Schottky diodes is considerably higher than the normal forward biasing voltage applied to the LED, so that no breakdown occurs).

Specifically, assume that unit A sends a data bit to unit B.

Initially, when no data transmission takes place, the common bidirectional serial data link $D_{CL}$ is at logic 1. At the level of unit B, this 1 logic is produced by pull-up resistor 62B producing substantially the power supply voltage Vdd at the anode of LED 58B and the cathode of Schottky diode 64B. This voltage is passed on via the LED 58B to the input of buffer 50B, reduced by the value of the forward bias voltage drop across LED 58B.

When sending the data bit, signal TxA produces a logic 1 pulse for a predetermined period t, so making FET 52A conductive. The voltage at the cathode of LED 58A shall then be substantially at ground potential (more precisely, ground potential plus the drain-source saturation voltage of FET 52A). LED 58A shall then become suitably biased and conduct a current along the path between Vdd and ground formed by pull-up resistor 62, LED 58A and FET 52A. LED 58A thereby illuminates and switches on phototransistor 60B. The collector of that phototransistor shall thus be at the voltage $V_{CEsat}$, close to ground potential. Schottky diode 64B then becomes momentarily conducting to pull out the charge accumulated at the buffer input, until its biasing voltage drops to its forward bias voltage value $V_{DSchott}$. At that point, the potential at the input to the buffer is equal to the potential at the Schottky diode cathode, $V_{CEsat}$, plus the threshold $V_{DSchott}$ of Schottky diode 64B. Both of these voltages are close to 0V, and their sum is also sufficiently close to 0V to be assimilated to a 0 logic state by buffer 50B. Accordingly, the signal on the common bidirectional data link $D_{CL}$ at the level of unit B drops from logic 1 to logic 0, at which it remains for the time t, so conveying one bit of information as required.

While LED 58A is made to illuminate to produce this condition, Schottky diode 64B remains biased at its threshold voltage $V_{DSchott}$. This voltage is also present as a reverse bias voltage on LED 58B. The latter cannot therefore be conducting and thus remains off.

By staying off while unit A is sending data, LED 58B cannot interfere with the sending operation and there is no risk of reaching a locking condition. The problem identified with the hypothetical circuit of FIG. 3 is thereby solved.

It is clear from the symmetry of the circuit elements that the same considerations apply when unit B is sending data.

Specifically, when initially no data transmission takes place the logic 1 on common bidirectional data link $D_{CL}$ at the level of unit B is produced by pull-up resistor 62A producing substantially the power supply Vdd at the anode of LED 58A and the cathode of Schottky diode 64A. This voltage is passed on via the LED 58A to the input of buffer 50A, reduced by the value of the forward bias voltage drop across LED 58A.

When sending the data bit from unit B, signal TxB produces a logic 1 pulse for a predetermined period t, so making FET 52B conductive. The voltage at the cathode of LED 58B shall then be substantially at ground potential (more precisely, ground potential plus the drain-source saturation voltage of FET 58B). LED 58B shall then become suitably biased and conduct a current along the path between Vdd and ground formed by pull-up resistor 62, LED 58B and FET 52B. LED 58B thereby illuminates and switches on phototransistor 60A. Its collector shall thus be at the voltage $V_{CEsat}$, close to ground potential. Schottky diode 64A then becomes momentarily conducting to pull out the charge accumulated at the buffer input, until its biasing voltage drops to its forward bias voltage value $V_{DSchott}$. At that point, the potential at the input to the buffer is equal to the potential at its cathode, VCEsat, plus the threshold VDSchott of Schottky diode 64A. Both of these voltages are close to 0V, and their sum is also sufficiently close to 0V to be assimilated to a 0 logic state by buffer 50A. Accordingly, the signal on common bidirectional data link $D_{CL}$ at the level of unit A drops from logic 1 to logic 0, at which it remains for the time t, so conveying one bit of information as required.

While LED 58B is made to illuminate to produce this condition, Schottky diode 64A remains biased at its threshold voltage $V_{DSchott}$. This voltage is also present as a reverse bias voltage on LED 58A. The latter cannot therefore be conducting and thus remains off.

It will be understood that the role of the Schottky diodes is to allow the voltage at the buffer input of a receiving unit to follow closely the voltage across phototransistor of that unit.

Figure 6:
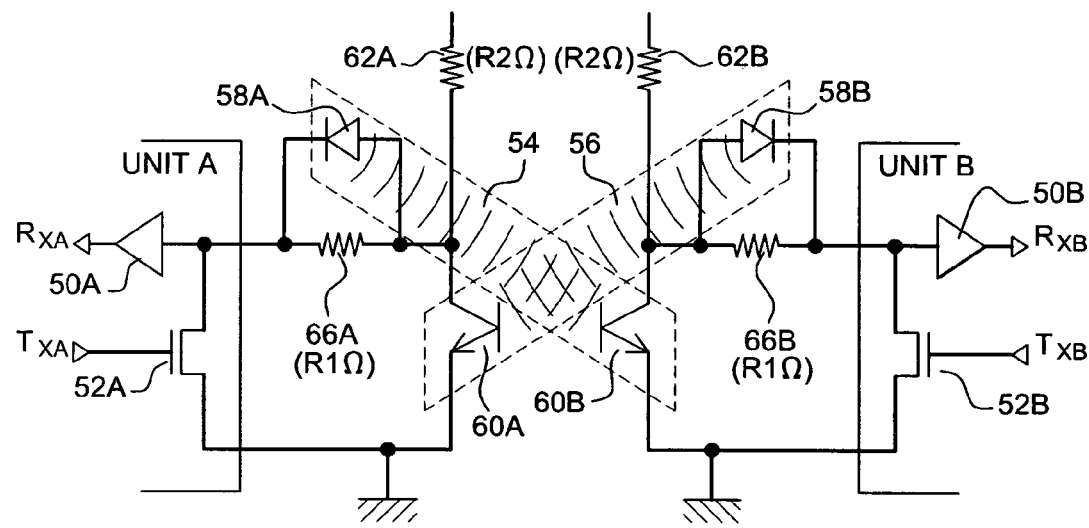
FIG. 6 is a circuit diagram of an opto-isolator circuit allowing bidirectional data communication over a common signal line in accordance with a second embodiment of the invention.

FIG. 6 shows a second embodiment of the invention, which differs from the first embodiment (FIG. 5) by the fact that Schottky diodes are replaced by resistors, designated 66A and 66B respectively for units A and B. Resistors 66A/66B have a resistance value R1 Ω typically of around 10KΩ.

The value R1 Ω is chosen such that:
the voltage drop across resistor 66A/66B of a unit which is sending data—i.e. for which its FET 52A/52B is conducting—is greater than the conduction threshold votage of its LED 58A/58B, and
the voltage drop across resistor 66A/66B of a unit which is receiving data—i.e. having its buffer input pulled to ground by its phototransistor—is less than the threshold voltage $V_{FD}$ of its parallel-connected LED 58A/58B, so ensuring that the latter remains off when its unit is in the receiving mode.

Figure 7:
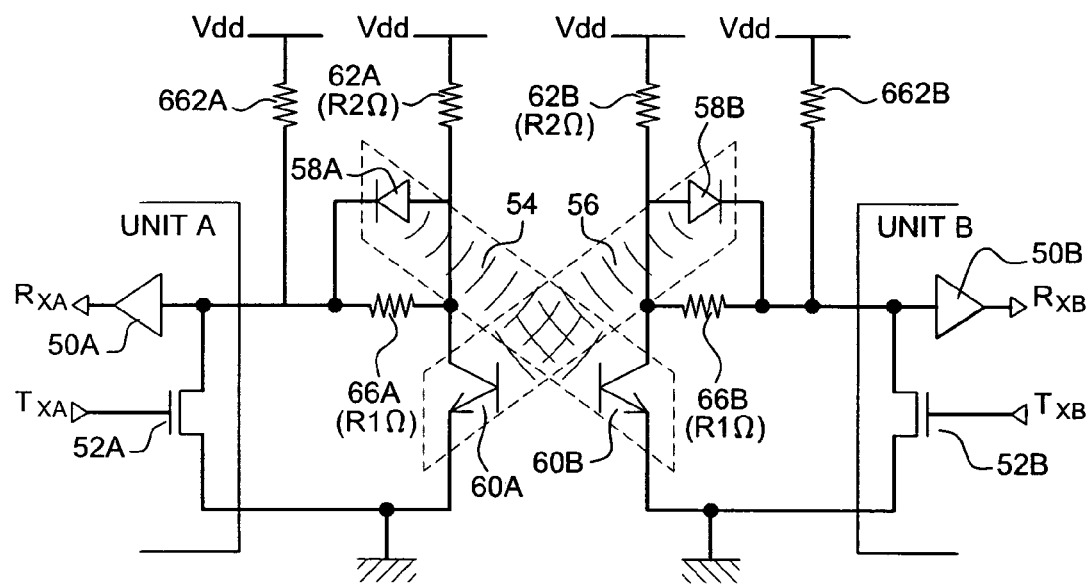
FIG. 7 is a circuit diagram showing a variant of the second embodiment, but applicable to other embodiments.

FIG. 7 shows a variant, applicable to any of the described embodiments, in which additional pull-up resistors 662A and 662B are each connected between the positive power supply Vdd and the input to the respective buffer 50A/50B. The presence of the additional pull-up resistors 662A and 662B can due e.g. to other possible requirements of the communicating units A, B.

The circuit of FIG. 7 shows this variant implemented with the second embodiment. In this case, additional pull-up resistors 662A/662B and the resistors 66A/66B form a voltage divider between Vdd and ground when the phototransistor of their respective unit is conducting (ignoring $V_{CEsat}$ of that phototransistor).

Figure 8A:
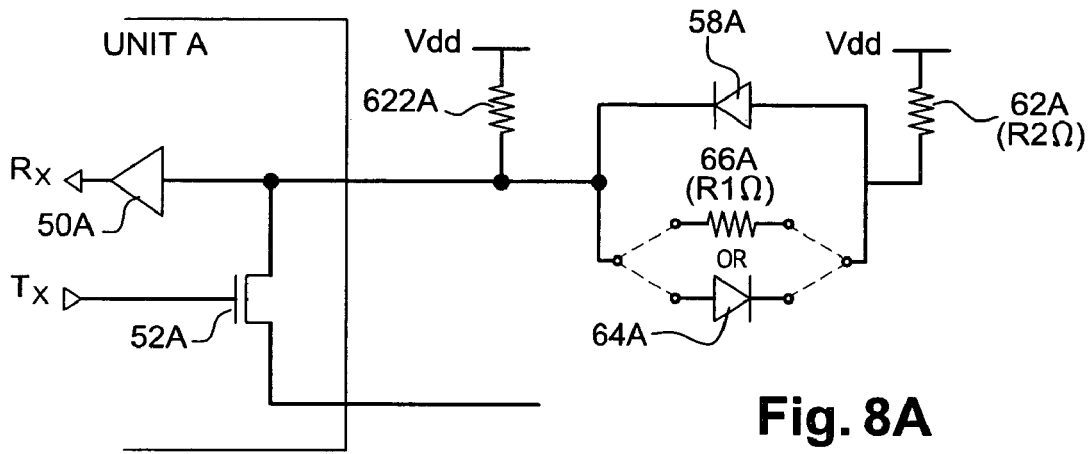
FIGS. 8A and 8B are circuit diagrams showing how a pull-up resistor can be placed at different points in the circuits of the embodiments.
Figure 8B:
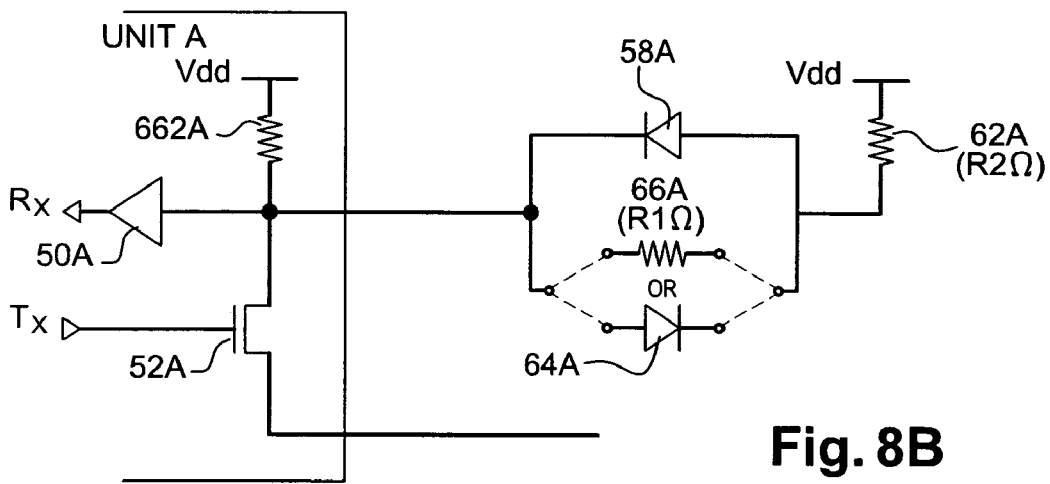

Now, with such a circuit configuration, the additional pull-up resistors 662A/662B can be placed physically either:
outside the unit A or B with which they are associated, whereupon they can be biased by a power supply serving for the opto-isolators 54 and 56, which is independent of the power supply for the unit A or B itself. This configuration is shown in FIG. 8A for the case of unit A, or
within the unit A or B with which they are associated, for instance if the additional pull-up resistors 662A/662B are already present on chip. This configuration is shown in FIG. 8B for unit A. In this case, the same power supply of the unit A or B serves to bias both the pull-up resistor 662A/662B and the resistor 66A/66B that replaces the Schottky diode.

The latter configuration (FIG. 8B) calls for some attention regarding the value R2 Ω of the additional pull-up resistor 662A/662B, since in that case it creates a resistive divider bridge with the resistor 64A that replaces the Schottky diode. Consequently, the voltage available at the buffer input can be insufficiently close to 0V to establish a 0 logic level when receiving data, being at an intermediate voltage set by the divider bridge. This problem can be overcome by choosing a ratio of values for R1 Ω and R2 Ω to create an acceptably small low voltage level at the receiving terminal.

Figure 9:
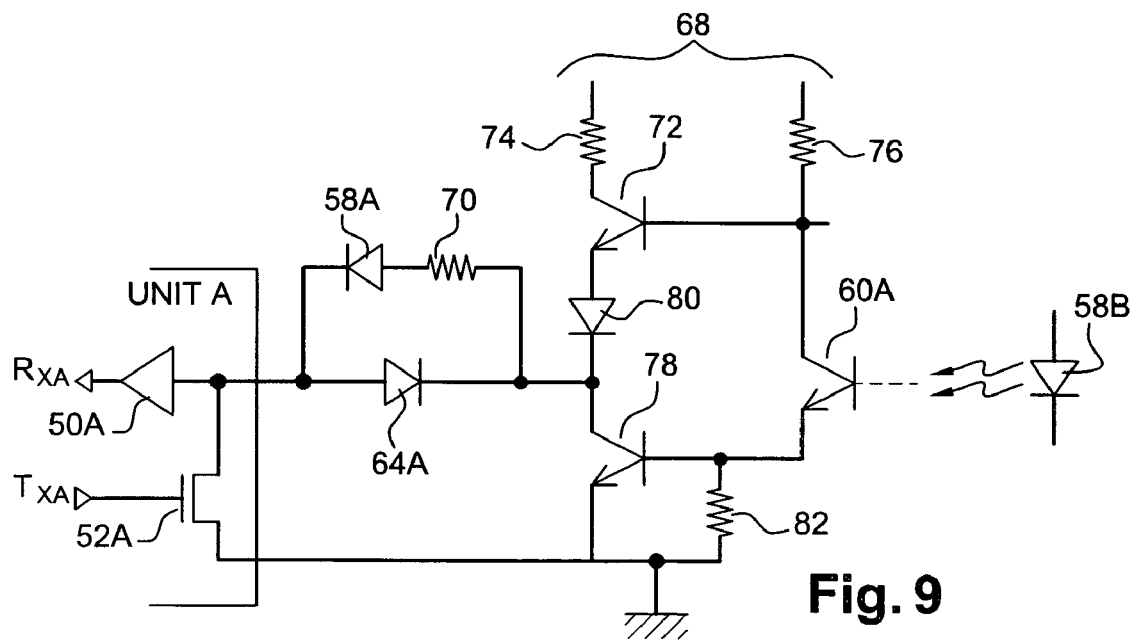
FIG. 9 is a circuit diagram of an opto-isolator circuit allowing bidirectional data communication over a common signal line in accordance with a third embodiment of the invention.

FIG. 9 shows a third embodiment of the invention, based on the embodiment of FIG. 3, with a connection at each end to a totem-pole coupler circuit. Most phototransistors have open collector outputs, but in very-high speed opto-coupling applications, totem-pole output photodetectors can be used instead. This variant calls for a modification of the previous circuit diagram, since the pull-up resistor is replaced by an active component, as illustrated.

Specifically, FIG. 9 shows the circuit configuration simply for unit A, it being understood that the configuration is the same for unit B.

At the level of the head-to-tail Schottky diode 64A and LED 58A, there is added a series resistor 70 having a first terminal connected to the anode of LED 58A and its second terminal connected to the cathode of Schottky diode 64A. Series resistor 70 serves to limit the current through LED 58A. In the previous embodiment, the current through that LED is limited by the pull-up resistor, absent from this circuit.

The circuitry in respect of the buffer 50A and FET switch 52A is the same as for the other embodiments.

The totem-pole circuitry is interposed between photodetector 60A and the cathode of the Schottky diode 64A. It comprises a first totem-pole bipolar NPN transistor 72 having its collector and base connected to a positive power supply voltage Vcc via respectively first and second biasing resistors 74 and 76. The emitter of the first totem-pole transistor 72 is connected to the collector of a second totem-pole transistor 78 via a diode 80, the cathode of the latter being connected to the emitter of first totem-pole transistor. The second totem-pole transistor 78 has its emitter connected directly to ground and its base connected to a first terminal of a third biasing resistor 82 having its second terminal connected to ground. Phototransistor 60 has its emitter connected directly to the base of the second totem-pole transistor 78 and its collector connected directly to the base of the first totem-pole transistor 72.

The above totem-pole configuration and its application notes for implementation with opto-isolator circuits can be found in manufacturers' data sheets, e.g. from Agilent Technologies, Palo Alto, Calif., US, circuit reference HCPL-2400/HCPL-2430.

The resistor between the collector and power supply rail of the totem-pole circuit is relatively weak, in the region of 70 Ω, and generally not sufficient to limit the current to the degree required. This is the reason why it is preferred to insert resistor 70 to limit the current drain, as explained above.

Figure 4:
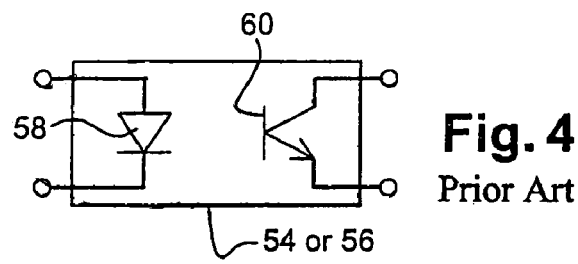
Figure 10:
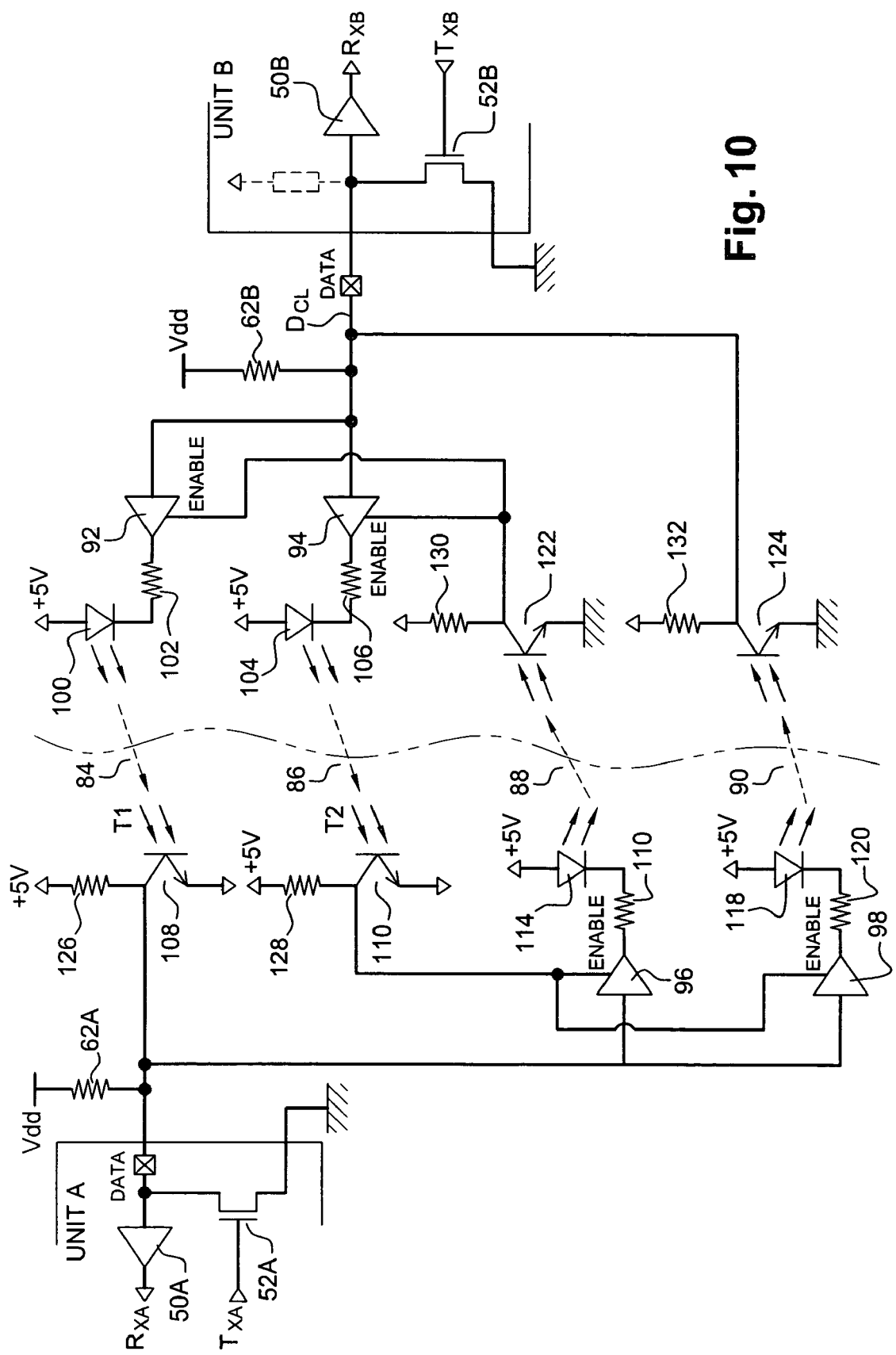
FIG. 10 is a circuit diagram of an opto-isolator circuit allowing bidirectional data communication over a common signal line in accordance with a fourth embodiment of the invention.

FIG. 10 illustrates a fourth embodiment of the invention, in which four opto-isolators 84-90 of the type shown in FIG. 4 are used to ensure the bi-directional exchange of data along a common bidirectional data link $D_{CL}$ between communicating units A and B.

In this approach, instead of using a Schottky diode which distinguishes between the signals according to their direction (to or from a given communicating device), four tri-state buffers 92-98 are provided to disconnect a part of the opto-coupling system depending on the transmission direction. The tri-state buffers are effectively transmission gates having an enable input. They each produce at their output the logic state corresponding to the voltage at their input if their enable input is at logic 1, otherwise the output is at a high impedance state.

The arrangement provides, symmetrically, two opto-isolators for each direction of data transfer, while the tri-state buffers prevent the operation of the two opto-isolators of one particular unit when the latter is receiving data via the other two opto-isolators, and vice-versa.

Specifically, the four opto-isolators are divided into two pairs, each pair serving for sending data along one direction only, as follows:

the first pair comprises first and second opto-isolators 84 and 86,
  the cathode of the first opto-isolator LED 100 is connected via a resistor 102 to the output of a first tri-state buffer 92,
  the cathode of the second opto-isolator LED 104 is connected via a resistor 106 to the output of a second tri-state buffer 94,
  the collector of the first opto-isolator phototransistor 108 is connected to the common bidirectional data link $D_{CL}$ at the level of unit A,
  the collector of the second opto-isolator phototransistor 110 is connected to the enable inputs of the two other tri-state buffers 96 and 98, designated third and fourth tri-state buffers and described below;

the second pair comprises third and fourth opto-isolators 88 and 90,
  the cathode of the third opto-isolator LED 114 is connected via a resistor 116 to the output of the third tri-state buffer 96,
  the cathode of the second opto-isolator LED 118 is connected via a resistor 120 to the output of the fourth tri-state buffer 98,
  the collector of the third opto-isolator phototransistor 122 is connected to the enable inputs of the first and second tri-state buffers 92 and 94, and
  the collector of the second opto-isolator phototransistor 124 is the common bidirectional data link $D_{CL}$ at the level of unit B.

Additionally, the collector of each opto-isolator phototransistor 108, 110, 122 and 124 is connected to the positive power supply via a pull-up resistor (respectively designated 126, 128, 130, 132).

The emitter of each opto-isolator phototransistor 108, 110, 122 and 124 is connected to the ground of their respective units A or B.

The anode of each opto-isolator LED 100, 104, 114 and 118 is connected to a positive power supply voltage Vdd of their respective units A or B.

The circuitry in respect of the buffer 50A/50B and FET 52A/52B is the same for the other embodiments.

When no unit is sending data, the common bidirectional data link $D_{CL}$ remains at logic 1. All four LEDs 100, 104, 114 and 118 are off and thus all four phototransistors 108, 110, 122 and 124 are off (non conducting). The corresponding high voltage level at their collectors (pulled up by respective pull-up resistors 126, 128, 130, 132) produces a logic 1 at each of the tri-state buffers 92-98, making them conducting.

If unit A, say, sends a data bit, its FET 52A is set conducting by the corresponding high voltage pulse at TxA on its gate, pulling the common bidirectional data link $D_{CL}$ at the level of unit A to ground. In response to this transition:
  the LEDS 114 and 118 of the third and fourth opto-isolators 88 and 90 are switched on;
  the phototransistor 122 of the third opto-isolator 88 is thereby made conducting and pulls the enable inputs of the first and second tri-state buffers 92 and 94 to logic 0V voltage. This causes the output of the first and second tri-state buffers to be in the high-impedance state, thereby preventing a current flow through the first and second opto-isolator LEDs 100 and 104;
  the phototransistor 124 of the fourth opto-isolator 90 is also made conducting and thereby pulls the common bidirectional data link $D_{CL}$ at the level of unit B to ground.

Conversely, if unit B sends a data bit, its FET 52B is set conducting by the corresponding high voltage pulse at TxB on its gate, pulling the common bidirectional data link $D_{CL}$ at the level of unit B to ground. In response to this transition:
  the LEDS 100 and 104 of the first and second opto-isolators 84 and 86 are switched on;
  the phototransistor 108 of the first opto-isolator 84 is thereby made conducting and pulls the enable inputs of the third and fourth tri-state buffers 96 and 98 to logic 0V voltage. This causes the output of the third and fourth tri-state buffers to be in the high-impedance state, thereby preventing a current flow through the third and fourth opto-isolator LEDs 114 and 118;
  the phototransistor 108 of the first opto-isolator 86 is also made conducting and thereby pulls the common bidirectional data link $D_{CL}$ at the level of unit A to ground.

The embodiment of FIG. 10 can be adapted to operate with outputs from totem-pole circuits as described above with reference to FIG. 9.

Likewise, it is possible to place a pull-up resistor 62A, 62B at one or both of units A and B.

Figure 11:
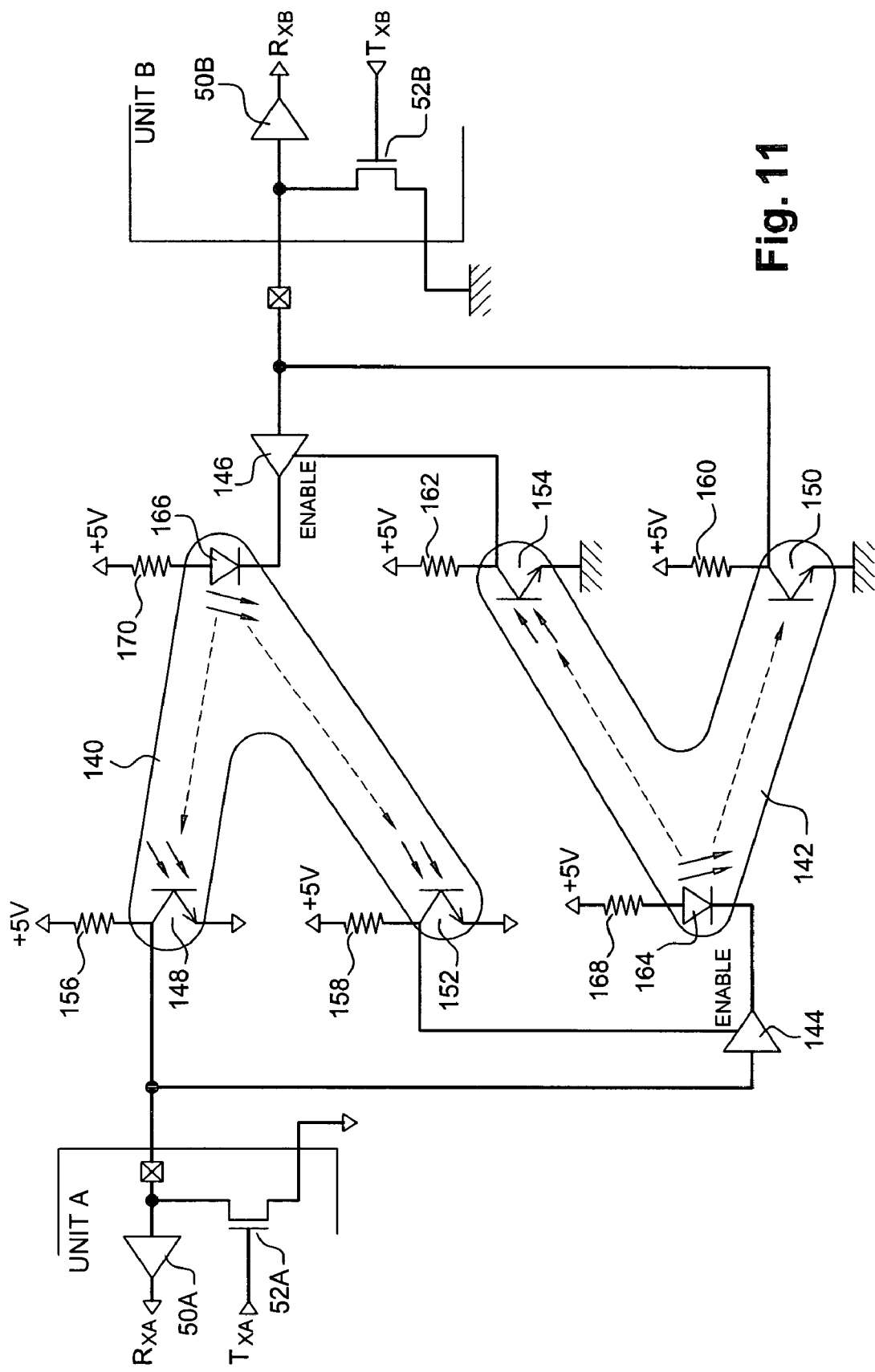
FIG. 11 is a circuit diagram of an opto-isolator circuit allowing bidirectional data communication over a common signal line in accordance with a fifth embodiment of the invention.

FIG. 11 illustrates a fifth embodiment which operates on similar principles compared to the fourth embodiment. However, in this embodiment, the classical logical type opto-isolators used in the previous embodiments are replaced by linear opto-isolators.

Linear opto-isolators are in themselves known in the art and used where the coupling calls for a linear response of received signal to a sending signal.

A single linear opto-isolator unit comprises in a single package one LED, typically an AlGaAs type, and two matched photodetectors (respectively designated first and second photodetectors), each arranged to respond to the illumination from the LED. The photodetectors are in a split arrangement, where a first photodetector provides a feedback for servo control of the LED drive current in order to ensure that the output signal is linearly related to the output flux of the LED. Such an approach compensates for the LED's non-linear time and temperature characteristics, and thereby allows an accurate signal to be collected from the second photodetector.

The fifth embodiment exploits the linear opto-isolator in a different manner and essentially makes use of the fact that the first and second photodetectors deliver two separate signals in response to the LED source.

As shown in the FIG. 11, first and second linear opto-isolators 140 and 142, where each photodetector is a phototransistor, are used in conjunction with two first and second tri-state buffers 144 and 146, the latter being of the same as described above in connection with the fourth embodiment.

The communicating units A and B are identical to those of the previous embodiment.

At the level of unit A, the communication line upstream of the buffer 50A is connected to a collector of a first photodetector 148 of the first linear opto-isolator 140 and to the input of the first tri-state buffer 146. Symmetrically, the communication line upstream of the buffer 50B at the level of unit B is connected to a collector of a first photodetector 150 of the second linear opto-isolator 142 and to the input of the second tri-state buffer 146.

The enable input of the first tri-state buffer 144 is connected to the collector of the second photodetector 152 of the first linear opto-isolator 140, and the enable input of the second tri-state buffer 146 is connected to the collector of the second photodetector 154 of the second linear opto-isolator 142.

Each photodetector 148, 152, 150, 154 of each linear opto-isolator 140, 142 has its emitter connected to ground and its collector additionally connected to a positive power supply voltage source (at 5V in the example) via a respective pull-up transistor 156, 158, 160, 162.

The first and second photodetectors 140 and 142 respectively have a LED 164, 166 whose anode is connected to the positive power supply voltage via a resistor 168, 170 and a cathode connected to the output respectively of the first and second tri-state buffers 114, 146.

In operation, when unit A is sending data whereby the communication line at its end is pulled to ground by FET 52A, the second photodetector 152 of the first linear opto-isolator 140 is non conducting, and its collector is thus pulled to the positive power supply voltage. The enable input of the first tri-state buffer is thus high, and the low level of the communication line thereby causes the output of that buffer to conduct a current from LED 164 of the first linear opto-isolator 142. The consequent illumination of that LED causes the first and second photodetectors 150 and 154 of the second linear opto-isolator 142 to be conducting. The conducting state of the first photodetector 150 pulls to ground the communication line at the level of the receiving unit (i.e. unit B), thereby passing on the data from sending unit, whereas the conducting state of the second photodetector 154 pulls to ground the enable input of the second tri-state buffer 146. Accordingly, the latter prevents a current flow through the LED 166 of the second linear opto-isolator 142 and thereby inhibits the operation of that LED of the receiving unit B when unit A is sending data.

Conversely, when unit B is sending data whereby the communication line at its end is pulled to ground by FET 52B, the second photodetector 162 of the second linear opto-isolator 142 is non conducting, and its collector is thus pulled to the positive power supply voltage. The enable input of the second tri-state buffer is thus high, and the low level of the communication line thereby causes the output of that buffer to conduct a current from LED 166 of the first linear opto-isolator 140. The consequent illumination of that LED causes the first and second photodetectors 148 and 152 of the first linear opto-isolator 140 to be conducting. The conducting state of the first photodetector 148 pulls to ground the communication line at the level of the receiving unit (i.e. unit A), thereby passing on the data from sending unit, whereas the conducting state of the second photodetector 152 pulls to ground the enable input of the second tri-state buffer 144. Accordingly, the latter prevents a current flow through the LED 164 of the first linear opto-isolator 140 and thereby inhibits the operation of that LED of the receiving unit A when unit B is sending data.

In this way, there is no possibility of a locking condition in which the LEDs 164 of both units are mutually kept active as a result of one of them being set to the illuminated state.

Figure 12:
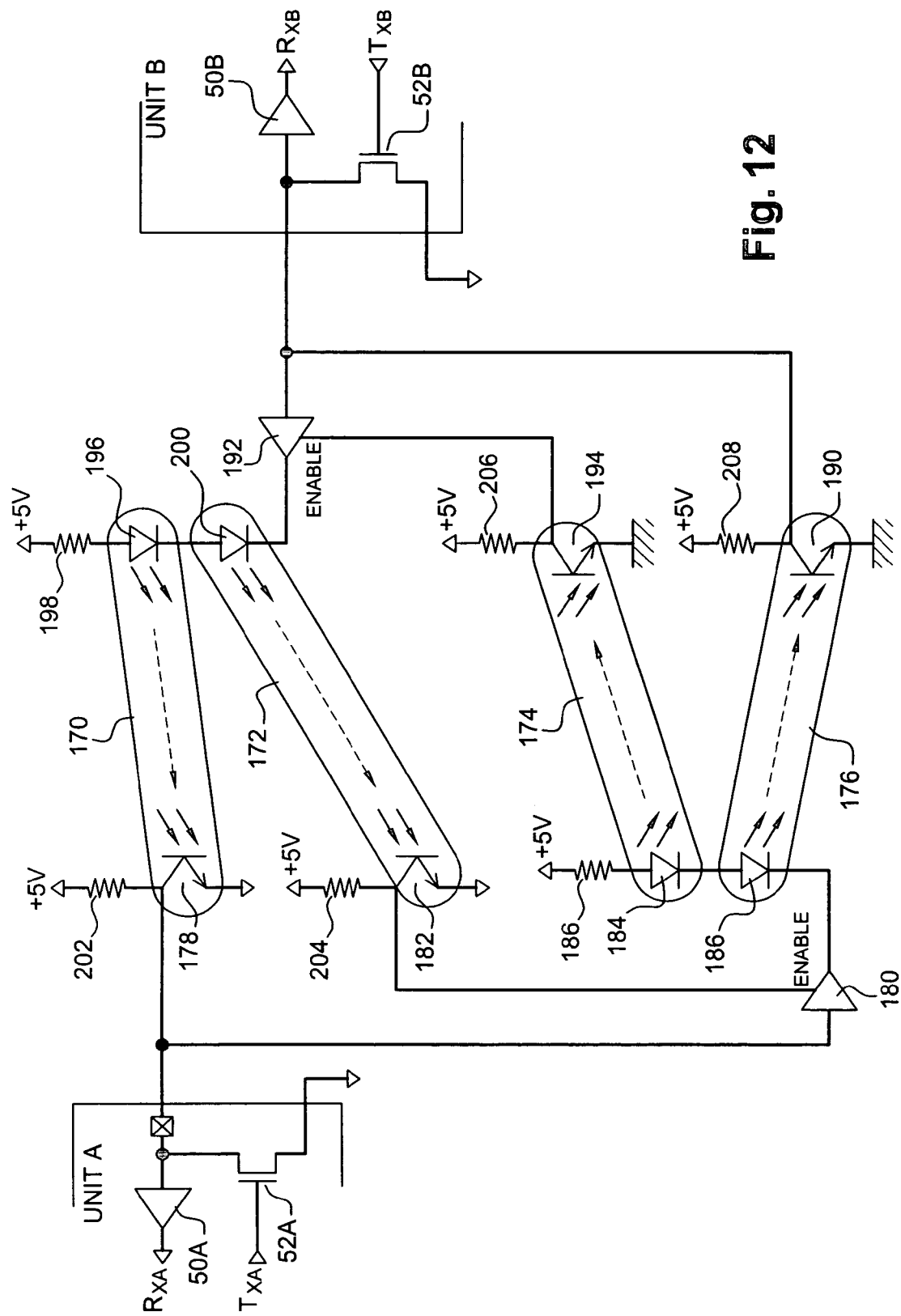
FIG. 12 is a circuit diagram of an opto-isolator circuit allowing bidirectional data communication over a common signal line in accordance with a sixth embodiment of the invention.

FIG. 12 illustrates a sixth embodiment, based on the use of four logic type opto-couplers and just two tri-state buffers, and in which the communicating units A and B are the same as for the embodiment of FIG. 10. The opto couplers, designated first to fourth opto-isolators 170, 172, 174, 176, are each comprised of a photodiode and a phototransistor, as described above with reference to FIG. 4.

At the level of unit A, the communication line upstream of the buffer 50A is connected to a collector of a phototransistor of the first opto-isolator 170 and to the input of a first tri-state buffer 180. The enable input of the latter is connected to the collector of the phototransistor 182 of the second opto-isolator 172.

The photodiodes of the third and fourth opto-isolators 174, 176 are connected in series, the photodiode 184 of the third opto-isolator 174 having its anode connected to a positive power supply voltage (5V in the example) via a resistor 188, and its cathode connected directly to the anode of the photodiode 186 of the fourth opto-isolator 176, the cathode of the latter photodiode being connected to the output of the first tri-state buffer 180.

Symmetrically, at the level of unit B, the communication line upstream of the buffer 50B is connected to a collector of a phototransistor 190 of the fourth opto-isolator 176 and to the input of a second tri-state buffer 192. The enable input of the latter is connected to the collector of the phototransistor 194 of the third opto-isolator 174.

The photodiodes of the first and second opto-isolators 170, 172 are connected in series, the photodiode 196 of the second opto-isolator 172 having its anode connected to a positive power supply voltage (5V in the example) via a resistor 198, and its cathode connected directly to the anode of the photodiode 200 of the second opto-isolator 172, the cathode of the latter photodiode being connected to the output of the second tri-state buffer 180.

For each opto-isolator, the collector of the phototransistor 178, 182, 190, 195 is connected to the positive power supply via a respective resistor 202, 204, 206, 208.

In operation, when unit A is sending a data bit, whereby the communication line at its end is pulled to ground by FET 52A, the phototransistor 182 of the second opto-isolator 172 is non conducting, and its collector is thus pulled to the positive power supply voltage. The enable input of the first tri-state buffer 180 is thus high, and its output is conducting. A current thereby flows through the two serially connected photodiodes 184, 186 of the third and fourth opto-isolators 174, 176.

The illuminated state of the latter photodiodes 184, 186 respectively causes the phototransistors 194, 190 of the third and fourth opto-isolators 174, 176 to be conducting. The conducting state of phototransistor 194 pulls to ground the enable input of the second tri-state buffer 192. The latter thereby becomes non conducting and blocks the current flow through the two serially connected photodiodes 196, 200 of the first and second opto-isolators 170, 172. In this way, illumination by the LEDs of the receiving unit B is inhibited while that unit is receiving data, and the corresponding phototransistors 178, 182 of the sending unit A are kept non conducting.

The conducting state of phototransistor 190 pulls to ground the communication line at the level of the receiving unit B, and thereby transmits the corresponding data bit by reproducing the low logic state imposed by the sending unit.

Conversely, when unit B is sending a data bit, whereby the communication line at its end is pulled to ground by FET 52B, the phototransistor 194 of the third opto-isolator 174 is non conducting, and its collector is thus pulled to the positive power supply voltage. The enable input of the second tri-state buffer 192 is thus high, and its output is conducting. A current thereby flows through the two serially connected photodiodes 196, 200 of the first and second opto-isolators 170, 172.

The illuminated state of the latter photodiodes 196, 200 respectively causes the phototransistors 178, 182 of the first and second opto-isolators 170, 172 to be conducting. The conducting state of phototransistor 182 pulls to ground the enable input of the first tri-state buffer 180. The latter thereby becomes non conducting and blocks the current flow through the two serially connected photodiodes 184, 186 of the third and fourth opto-isolators 174, 176. In this way, illumination by the LEDs of the receiving unit A is inhibited while that unit is receiving data, and the corresponding phototransistors 194, 190 of the sending unit B are kept non conducting.

The conducting state of phototransistor 178 pulls to ground the communication line at the level of the receiving unit A, and thereby transmits the corresponding data bit by reproducing the low logic state imposed by the sending unit.

This arrangement likewise ensures that the activation of a LED at the level of the sending unit inhibits the activation of the LEDs at the receiving unit, and thereby prevents a locking condition.

The embodiments described can be applied universally to different types of busses for the common bidirectional data link $D_{CL}$, examples being: the above-mentioned ICC bus, the IIC (Inter Integrated Circuit) bus, the CAN bus, LIN bus, etc.

The number of intercommunicating units thus linked via an opto-isolator system as described can be greater than two, using known multiplexing techniques and adapting the routing of the opto-isolator circuit configuration accordingly. For instance, this can be achieved by connecting each communicating unit through a respective strand of a fiber-optic cable using a splitter for each of nodes, using standard optical multiplexing techniques.

The FETs 52A/52B of the embodiments operates as a semiconductor switch and can be replaced by any other equivalent device, such as a bipolar or other MOS transistor. Moreover, they can be integrated within the unit, e.g. forming part of a microcontroller package, or incorporated in physical interface IC.

The buffers 50A/50B serve to convert input voltage values to corresponding logic levels, and can be chosen according to the application, e.g. adapted for CMOS, TTL logic, etc. They may be inverting if needs be, and simply omitted if the input voltages are sufficiently well adapted to the required logic level.

The logic states described in the embodiments can of course be inverted, e.g. the communication data link can be normally biased to a low logic voltage level when not sending data, and pulled to a high logic voltage level for sending a data bit.

Similarly, the photon sources such as the LEDs of the opto-isolators can be kept in the illuminating state by default, whereupon a data element is signalled by interrupting the illuminating state.

It is apparent that features of the different embodiment can be combined where appropriate, and that teachings given in the light of an embodiment are equally applicable, where appropriate to the teachings of other embodiments.

The invention claimed is:

1. An optical coupling device operative over a bidirectional data link between at least first and second communicating units, each operative to send and receive data along a common wire of said data link, said device comprising:
   at least first and second optical coupling means each comprising a photon flux source and a photon flux detector, wherein:
      the photon flux source of said first optical coupling means is commanded in response to a data transmission by said first communicating unit,
      the photon flux source of said second optical coupling means is commanded in response to a data transmission by said second communicating unit,
      the photon flux detector of said first optical coupling means is operative to produce a signal on said data link at said first communicating unit in response to a command of the photon flux source of said second optical coupling means from said second communicating unit, and
      the photon flux detector of said second optical coupling means is operative to produce a signal on said data link at said second communicating unit in response to a command of the photon flux source of said first optical coupling means from said first communicating unit;
   first inhibiting means for inhibiting the photon flux source of said second optical coupling means in response to an activation of the photon flux source of said first optical coupling means; and
   second inhibiting means for inhibiting the photon flux source of said first optical coupling means in response to an activation of the photon flux source of said second optical coupling means,
   wherein said bidirectional data link is normally biased to a first state when no data is present, data on said link being expressed by a forcing of said link to a second state,
   wherein at least one said communicating unit comprises:
      a first connection path for connecting said data link to a source at said second state, said first path having interposed therealong a switch controlled by a data signal to be sent by said unit, whereby said data link can be forced to said second state in response to said data signal to be sent, and
      a second connection path for connecting said data link to a source at said second state, said second path having interposed therealong a said photon flux detector responsive to a photon flux from another communicating unit sending data to said communicating unit, said photon flux detector blocking said second path in the absence of a photon flux and making said second path connect said transmission link to said source at said second state in the presence of a photon flux,
   wherein said photon flux source operative in response to said data signal to be sent by said communicating unit, said photon flux source being active when biased at a level above a threshold value and being connected between a driving power source and said source at said second state via said switch of said first conduction path, said photon flux source thereby being biased above said threshold value when said switch is conducting, and wherein said inhibiting means comprises means for forcing the biasing level of said photon flux source to be below said threshold value when said second connection path is made to connect said data link to said source at said second state, in the presence of said photon flux on said photon flux detector.

2. Device according to claim 1, wherein said photon source is a light emitting diode, and wherein said inhibiting means comprises a diode connected in parallel head to tail with said light emitting diode, said diode having a threshold voltage lower than the threshold voltage of said light emitting diode.

3. Device according to claim 1, said photon source is a light emitting diode, and wherein said inhibiting means comprises a Schottky diode connected in parallel head to tail with said light emitting diode, said diode having a threshold voltage lower than the threshold voltage of said light emitting diode.

4. Device according to claim 1, said photon source is a light emitting diode, and wherein said inhibiting means comprises passive resistor means.

5. Device according to claim 1, wherein first and second states are respectively first and second voltage levels, said bidirectional data link being biased to said first voltage level via resistive biasing means connected to a voltage source, said photon flux source and said photon flux detector serving respectively for sending and receiving data.

6. Device according to claim 1, wherein said first and second states are respectively first and second voltage levels, said first voltage level being higher than said second voltage level, and wherein said photon source is inactive when not sending data.

7. Device according to claim 1, wherein:
said photon flux source is a light emitting diode,
said photon flux detector is a transistor forming a conductive channel between first and second transistor terminals when detecting a photon flux, said second terminal being connected to a second voltage level,
said inhibiting means is a Schottky diode,
said first and second states are respectively first and second voltage levels, said first voltage level being higher than said second voltage level,
for a given said communicating unit,
said light emitting diode for sending data is connected in parallel "head-to-foot", the cathode of said light emitting diode being connected to the anode of Schottky diode and the anode of said light emitting diode being connected to said cathode of Schottky diode,
said communicating unit defines first and second nodes (N1 and N2),
said first node being common to:
  i) a terminal of a resistive biasing means that is opposite the terminal connected to a positive power supply voltage,
  ii) the anode of said light emitting diode,
  iii) the cathode of said Schottky diode, and
  vi) said first terminal of said phototransistor, said second node N2 being common to:
  i) said data link, at a data receiving input of a communicating terminal,
  ii) the cathode of said light emitting diode, and
  iii) the anode of said Schottky diode.

8. Device according to claim 1, wherein said photon flux detector is a phototransistor in an open collector configuration.

9. Device according to claim 1, wherein said photon flux detector is a photodetector in a totem-pole circuit configuration.

10. Device according to claim 1, wherein said photon flux detector is a photodetector in a totem-pole circuit configuration, said totem-pole circuit providing a bias voltage for said data link DCL, and wherein current limiting means are provided in series with said photon flux source.

11. An optical coupling device operative over a bidirectional data link between at least first and second communicating units, each operative to send and receive data along a common wire of said data transmission link, said device comprising:
at least first and second optical coupling means, each comprising a photon flux source and a photon flux detector, wherein:
  the photon flux source of said first optical coupling means is commanded in response to a data transmission by said first communicating unit,
  the photon flux source of said second optical coupling means is commanded in response to a data transmission by said second communicating unit,
  the photon flux detector of said first optical coupling means is operative to produce a signal on said data transmission link at said first communicating unit in response to a command of the photon flux source of said second optical coupling means from said second communicating unit, and
  the photon flux detector of said second optical coupling means is operative to produce a signal on said data link at said second communicating unit in response to a command of the photon flux source of said first optical coupling means from said first communicating unit;
first inhibiting means for inhibiting the photon flux source of said second optical coupling means in response to an activation of the photon flux source of said first optical coupling means; and
second inhibiting means for inhibiting the photon flux source of said first optical coupling means in response to an activation of the photon flux source of said second optical coupling means, wherein said photon flux source comprises a light emitting diode, and wherein each of said first and second inhibiting means comprises a Schottky diode electrically coupled with said light emitting diode.

12. Device according to claim 11, comprising first to fourth optical coupling means between said first and second communicating units, the four optical coupling means being divided into two pairs, each pair serving for sending data along one direction only, wherein:
said photon flux source is a light emitting diode,
said photon flux detector is a transistor forming a channel between first and second transistor terminals, said channel being conductive when said detector is detecting a photon flux, said second terminal being connected to a second voltage level,
said inhibiting means comprise first to fourth tri-state buffers having an enable input responsive to a first logic state to enable an output thereof to conduct, said output being at a voltage level corresponding to a voltage applied at an input thereof, and responsive to a second logic state to produce a high impedance condition at said output,
said first pair comprises said first and second optical coupling means, such that a cathode of a light emitting diode of the first optical coupling means is connected to the output of a first tri-state buffer, a cathode of a light emitting diode of the second optical coupling means is connected to the output of a second tri-state buffer, a first terminal of a first phototransistor of the first optical coupling means is connected to a data link at said first unit, a first terminal of a second phototransistor of the second optical coupling means is connected to an enable inpue input of each of said third and fourth tri-state buffers, said second pair comprises said third and fourth optical coupling means, such that a cathode of a light emitting diode of the third optical coupling means is connected to the output of said third tri-state buffer, a cathode of a light emitting diode of the fourth optical coupling means is connected to the output of said fourth tri-state buffer, a first terminal of a third phototransistor of said third optical coupling means is connected to an enable input of each of said first and second tri-state buffers, a first terminal of a fourth phototransistor of the fourth optical coupling means is connected to a data link at said second communicating unit, said first terminal of each of the four phototransistors is connected to a positive power supply via a resistive biasing means, and an anode of each light emitting diode of each optical coupling means is connected to a positive power supply voltage of its respective communicating unit.

13. Device according to claim 11, wherein said optical coupling means comprises at least one logic type opto-isolator.

14. Device according to claim 11, wherein said optical coupling means comprises at least one linear type opto-isolator comprising an illumination source and first and second matched photodetectors each responsive to an illumination from said source, wherein a detection signal from said first photodetector serves to convey received data and a detection signal from said second photodetector serves to produce a signal for inhibiting an illumination source of the communicating unit receiving said data.

15. Device according to claim 11, wherein said data link is a bidirectional serial type link.

16. A method of providing an optical coupling over a bidirectional data link between at least first and second communicating units, each operative to send and receive data along a common wire of said data transmission link, comprising the steps of:

providing at least first and second optical coupling means each comprising a photon flux source and a photon flux detector, wherein:

commanding the photon flux source of said first optical coupling means in response to a data transmission by said first communicating unit, commanding the photon flux source of said second optical coupling means in response to a data transmission by said second communicating unit, causing the photon flux detector of said first optical coupling means to produce a signal on said data transmission link at said first communicating unit in response to a command of the photon flux source of said second optical coupling means from said second communicating unit, causing the photon flux detector of said second optical coupling means to produce a signal on said data link at said second communicating unit in response to a command of the photon flux source of said first optical coupling means from said first communicating unit, inhibiting, by first inhibiting means, the photon flux source of said second optical coupling means in response to an activation of the photon flux source of said first optical coupling means, and inhibiting, by second inhibiting means, the photon flux source of said first optical coupling means in response to an activation of the photon flux source of said second optical coupling means, wherein said photon flux source comprises a light emitting diode, and wherein each of said first and second inhibiting means comprises a Schottky diode electrically coupled with said light emitting diode.

17. Method according to claim 16, using first to fourth optical coupling means between said first and second communicating units, the four optical coupling means being divided into two pairs, each pair serving for sending data along one direction only, wherein:

said photon flux source is a light emitting diode, said photon flux detector is a transistor forming a channel between first and second transistor terminals, said channel being conductive when said detector is detecting a photon flux, said second terminal being connected to a second voltage level, said inhibiting means comprise first to fourth tri-state buffers having an enable input responsive to a first logic state to enable an output thereof to conduct, said output being at a voltage level corresponding to a voltage applied at an input thereof, and responsive to a second logic state to produce a high impedance condition at said output, said first pair comprises said first and second optical coupling means, such that a cathode of a light emitting diode of the first optical coupling means is connected to the output of a first tri-state buffer, a cathode of a light emitting diode of the second optical coupling means is connected to the output of a second tri-state buffer, a first terminal of a first phototransistor of the first optical coupling means is connected to a data link at said first unit, a first terminal of a second phototransistor of the second optical coupling means is connected to an enable input of each of said third and fourth tri-state buffers, said second pair comprises said third and fourth optical coupling means, such that a cathode of a light emitting diode of the third optical coupling means is connected to the output of said third tri-state buffer, a cathode of a light emitting diode of the fourth optical coupling means is connected to the output of said fourth tri-state buffer, a first terminal of a third phototransistor of said third optical coupling means is connected to an enable input of each of said first and second tri-state buffers, a first terminal of a fourth phototransistor of the fourth optical coupling means is connected to a data link at said second communicating unit, said first terminal of each of the four phototransistors is connected to a positive power supply via a resistive biasing means, and an anode of each light emitting diode of each optical coupling means is connected to a positive power supply voltage of its respective communicating unit.

18. Method according to claim 16, wherein said data link is a bidirectional serial type link.

19. A method of providing an optical coupling over a bidirectional data link between at least first and second communicating units, each operative to send and receive data along a common wire of said data link, comprising the steps of:
providing at least first and second optical coupling means each comprising a photon flux source and a photon flux detector, wherein:
commanding the photon flux source of said first optical coupling means in response to a data transmission by said first communicating unit,
commanding the photon flux source of said second optical coupling means in response to a data transmission by said second communicating unit,
causing the photon flux detector of said first optical coupling means to produce a signal on said data link at said first communicating unit in response to a command of the photon flux source of said second optical coupling means from said second communicating unit,
causing the photon flux detector of said second optical coupling means to produce a signal on said data link at said second communicating unit in response to a command of the photon flux source of said first optical coupling means from said first communicating unit,
inhibiting the photon flux source of said second optical coupling means in response to an activation of the photon flux source of said first optical coupling means, and
inhibiting the photon flux source of said first optical coupling means in response to an activation of the photon flux source of said second optical coupling means,
normally biasing said bidirectional data transmission link to a first state when no data is present, data on said link being expressed by a forcing of said link to a second state,
for at least one said communicating unit:
creating a first connection path for connecting said data link to a source at said second state, said first path having interposed therealong a switch controlled by a data signal to be sent by said unit, whereby said data link is forced to said second state in response to said data signal to be sent, and
creating a second connection path for connecting said data link to a source at said second state, said second path having interposed therealong comprising a said photon flux detector responsive to a photon flux from another communicating unit sending data to said communicating unit, said photon flux detector blocking said second path in the absence of a photon flux and making said second path connect said data link to said source at said second state in the presence of a photon flux,
operating said photon flux source in response to said data signal to be sent by said communicating unit, said photon flux source being active when biased at a level above a threshold value and being connected between a driving power source and said source at said second state via said switch of said first conduction path, said photon flux source thereby being biased above said threshold value when said switch is conducting, and said inhibiting step comprising forcing the biasing level of said photon flux source to be below said threshold value when said second connection path is connecting said link to said source at said second state, in the presence of said photon flux on said photon flux detector.

20. Method according to claim 19, wherein said photon source is a light emitting diode, and wherein said inhibiting means comprises a diode connected in parallel head to tail with said light emitting diode, said diode having a threshold voltage lower than the threshold voltage of said light emitting diode.

21. Method according to claim 19, wherein said photon source is a light emitting diode, and wherein said inhibiting means comprises a Schottky diode connected in parallel head to tail with said light emitting diode, said diode having a threshold voltage lower than the threshold voltage of said light emitting diode.

22. Method according to claim 19, wherein said photon source is a light emitting diode, and wherein said inhibiting means comprises passive resistor means.

23. Method according to claim 19, wherein first and second states are respectively first and second voltage levels, said bidirectional data link being biased to said first voltage level via resistive biasing means connected to a voltage source, said photon flux source and said photon flux detector serving respectively for sending and receiving data.

24. Method according to claim 19, wherein said first and second states are respectively first and second voltage levels, said first voltage level being higher than said second voltage level, and wherein said photon source is inactive when not sending data.

25. Method according to claim 19, wherein:
said photon flux source is a light emitting diode,
said photon flux detector is a transistor forming a conductive channel between first and second transistor terminals when detecting a photon flux, said second terminal being connected to a second voltage level,
said inhibiting means is a Schottky diode,
said first and second states are respectively first and second voltage levels, said first voltage level being higher than said second voltage level,
for a given said communicating unit,
said light emitting diode for sending data is connected in parallel "head-to-foot", the cathode of said light emitting diode being connected to the anode of Schottky diode and the anode of said light emitting diode being connected to said cathode of Schottky diode,
said communicating unit defines first and second nodes (N1, N2), said first node being common to:
i) a terminal of a resistive biasing means that is opposite the terminal connected to a positive power supply voltage,
ii) the anode of said light emitting diode,
iii) the cathode of said Schottky diode, and
vi) said first terminal of said phototransistor, said second node N2 being common to:
i) said data link, at a data receiving input of a communicating terminal,
ii) the cathode of said light emitting diode, and
iii) the anode of said Schottky diode.

* * * * *